United States Patent [19]

Harvey et al.

[11] Patent Number: 5,296,044
[45] Date of Patent: Mar. 22, 1994

[54] LIGHTWEIGHT STOWABLE AND DEPLOYABLE SOLAR CELL ARRAY

[75] Inventors: T. Jeffrey Harvey, Lompoc; P. Alan Jones, Santa Barbara, both of Calif.

[73] Assignee: AEC-Able Engineering Company, Inc., Goleta, Calif.

[21] Appl. No.: 847,720

[22] Filed: Mar. 6, 1992

[51] Int. Cl.⁵ .......................................... H01L 31/045
[52] U.S. Cl. .................................. 136/245; 136/292
[58] Field of Search ............... 136/245, 292; 244/173

[56] References Cited

U.S. PATENT DOCUMENTS

| | | | |
|---|---|---|---|
| 4,030,102 | 6/1977 | Kaplan et al. | 343/915 |
| 4,401,710 | 8/1983 | Basemir et al. | 428/229 |
| 4,686,322 | 8/1987 | Kujas | 136/245 |
| 4,968,372 | 11/1990 | Maass | 156/249 |

OTHER PUBLICATIONS

H. W. Scheel, "A Circular Solar Array", *Conference Record*, 9th IEEE Photovoltaic Specialists Conf. (May 1972), pp. 271-280.

Primary Examiner—Aaron Weisstuch
Attorney, Agent, or Firm—Donald D. Mon

[57] ABSTRACT

A solar cell array deployable from a folded flat triangular structure to a substantially circular deployed shape. A root spar supports a hub. The hub has an axis of rotation normal to the axis of the root spar. The hub drives a lead spar, and a plurality of intermediate spars rotate freely around the hub. A foldable gore is fitted between each pair of adjacent spars except between the root spar and the lead spar. Rotation of the hub in one direction folds the gores into a stack. Rotation in the opposite direction opens the gores to form tensioned membranes between the spars. A reversible power source drives the hub.

7 Claims, 2 Drawing Sheets

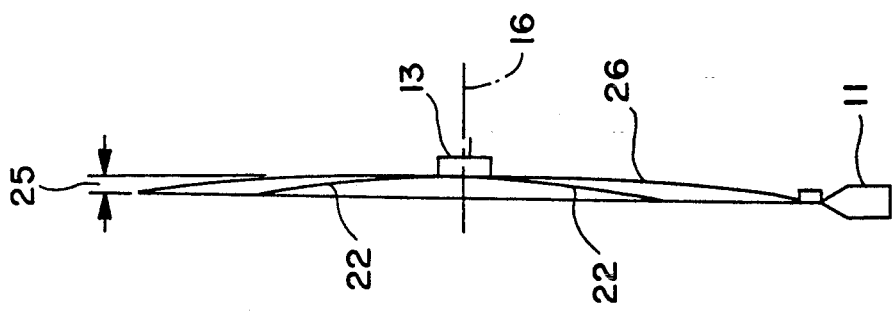
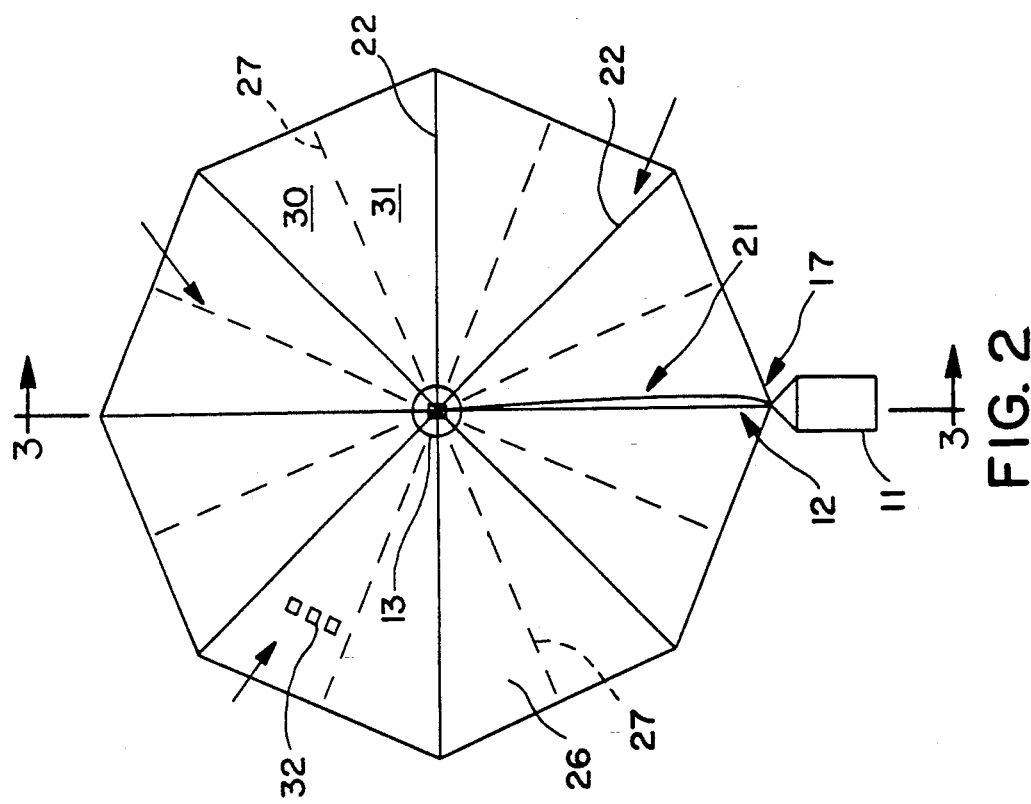
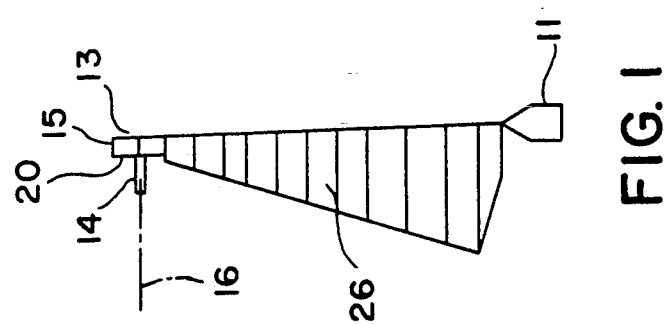

LIGHTWEIGHT STOWABLE AND DEPLOYABLE SOLAR CELL ARRAY

FIELD OF THE INVENTION

This invention relates to a solar cell array which is light of weight, provides a substantial area for exposure to the sun, and is stowable in a small space.

BACKGROUND OF THE INVENTION

Solar cell arrays comprise an underlying structure for supporting a substantial number of individual cells, plus the cells. The cells themselves are rigid plate-like structures. In previously known arrays they are usually mounted to a rigid panel. For fixed installations the frame itself is entirely rigid. For arrays on spacecraft it is customary to adapt the panels for stowage by means such as hinges which will permit the panels to be folded against each other to reduce the dimensions of the array to a stowable configuration. All of this involves items such as hinges and actuating means such as cables, which must not fail lest the array be rendered useless. They are costly, and involve weight which should be minimized.

It is an object of this invention to provide a solar cell array whose stowage and deployment are accomplished by rotational movement of spars around a central hub. Gores which extend radially between the spars are opened or folded as a consequence of this rotary motion to deploy or to stow the array.

It is an optional object of this invention to apply power only at the hub in order to deploy or to stow the array, whereby to provide for lightness of weight, reliability, and economy of the array.

It is yet another optional object of this invention to provide a substrate which can be folded, thereby to eliminate the need for a rigid supporting frame.

BRIEF DESCRIPTION OF THE INVENTION

A solar cell array according to this invention is supported by a root spar. Mounting means for the array is provided by a drive gimbal or other means which provides support, and usually also provides rotational movement to the root spar so the array can be directed toward the sun.

The axle of a hub is rigidly fixed to the root spar. A hub rotor is rotatably fitted to the axle, the hub comprising the axle and the rotor, and having an axis of rotation normal to the root spar.

A lead spar is rigidly mounted to the rotor, and extends radially from it. A plurality of intermediate spars are mounted to the hub for free rotation relative to the hub. They also extend radially from the hub.

A gore is attached at its radial edges between each pair of spars, but not between the root spar and the lead spar, which are not interconnected. The gores are adapted to fold at a mid-gore flexure which extends radially from the hub. Optionally, a hinge can be used instead of a fold of the material but this is not preferred. Solar cells are mounted to the gores except at the flexures.

According to a preferred but optional feature of the invention, the gores are made of a glass or quartz cloth for lightness of weight and the ability to fold along the flexure.

To stow the array, the lead spar is rotated in one direction toward the root spar, so the spars are all brought toward one another and the faces of each gore are brought together as the gores are folded. To deploy the array, the lead spar is rotated in the other direction to open the folds and form the gores as tensioned membranes.

To control the stack of folded gores when the array is stowed, the panels of the gore next to the root spar and next to the lead spar are formed more rigidly, such as backing by plates so the stack will be held compressed between them. Layers of foam, such as polyimide foam, evenly distribute pressure to insure survival of solar cells under severe vibrational environments such as rocket launch vehicles.

The above and other features of this invention will be fully understood from the following detailed description and the accompanying drawings, in which:

BRIEF DESCRIPTION OF THE DRAWINGS

FIG. 1 is a semi-schematic side elevation of the array in its stowed configuration;

FIG. 2 is a semi-schematic front elevation showing the array deployed;

FIG. 3 is a semi-schematic cross-section taken at line 3—3 in FIG. 2 also showing the array in its deployed condition.

DETAILED DESCRIPTION OF THE INVENTION

Figure 4:
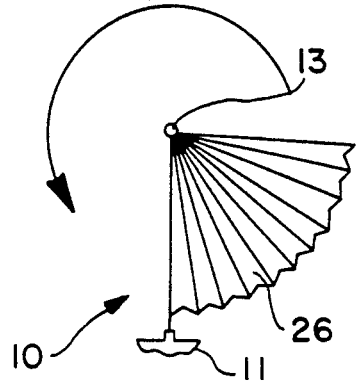
FIGS. 4, 5, and 6 show three positions in the deployment sequence.
Figure 5:
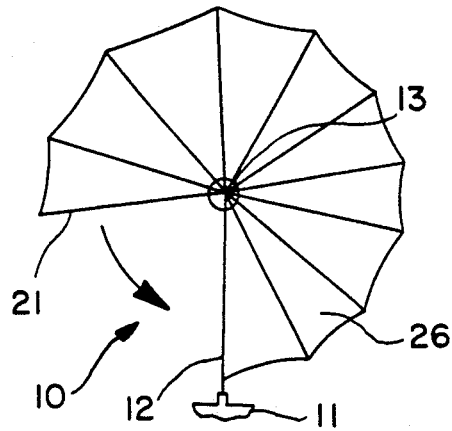

The presently-preferred embodiment of a solar cell array 10 according to this invention is shown in the drawings. It is supported on a base 11 of some suitable kind. On spacecraft, for example, it will often be a gimbal mount 17 which enables the array to be rotated to point the array as closely toward the sun as possible.

A static panel 12 is mounted to the base and extends away from it. In addition to support for the stack when stowed, it functions as a static spar, and will frequently be referred to as such. A hub 13 is mounted to the static panel, spaced from the base. The hub comprises an axle 14 that is rigidly mounted to the static panel, and a rotor 15 which is mounted to and rotatable around the axle. The hub has an axis 16 of rotation.

A drive 20 is attached to the axle and to the rotor, so that its rotary power will cause the rotor to rotate around axis 16.

A pivot panel 21 is rigidly attached to the rotor. This panel functions as a lead spar and will frequently be referred to as such. A plurality of intermediate spars 22 are freely pivoted to the axle or to the rotor as preferred, so as to be freely rotatable relative to the axle and to the root spar and to the lead spar.

All of the spars extend radially from the hub, and may if desired lie in planes normal to the hub. However, some advantages are attained by allowing the intermediate spars to deflect relative to said normal plane, so as to create a cupped deployed shape whose cup depth 25 is shown in FIG. 3. In both such arrangements the spars are defined as being radially directed from the hub.

A plurality of gores 26, conveniently eight in number, are installed between each pair of adjacent spars. However, no gore is connected between the root spar and the lead spar.

As will later be shown, the gores are preferably made of a flexible material with a mid-gore flexure 27, which is an area of the gore devoid of solar cells, and which may be pre-creased for guidance in folding. The flexures extend radially from near the hub. Each bisects its respective gore. Thus, each gore has two panels 30 and 31, one on each side of the flexure.

Solar cells 32 of any suitable size and shape are mounted to the gores, except at the flexures. The gores on each side of the flexure, while enjoying some limited inherent flexibility, are primarily intended to remain flat. The entire gore may be flat when deployed, behaving as a taut membrane.

To stow the array, the lead spar is rotated clockwise in FIG. 2. This movement reduces the apex angles between adjacent spars, so the gores begin to fold along their mid-gore flexures. When the pivot panel has made a nearly complete turn around the axle, the panels 30,31 on opposite sides of the flexures will have been brought together and compressed by polyimide foam disposed on the inward surfaces of both the panel adjacent to the root spar and the panel adjacent to the lead spar. The stowed height has been reduced to half that of the deployed configuration, and the large face of the deployed condition has been reduced to a stack of triangular gore sections (the panels), which is as close to a flat pack as is possible in view of the geometry of the system. The various spars may be individually shaped to allow for this stowage.

Figure 6:
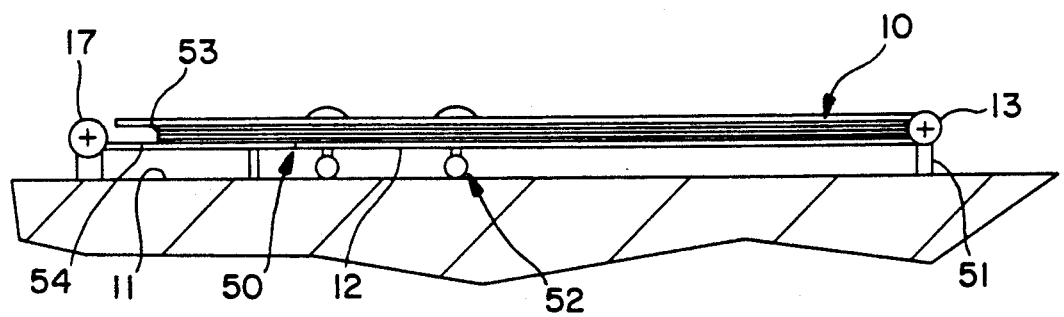

FIG. 6 illustrates the stowed condition in additional detail. The array 10 is mounted at its hub 13 to its root spar, and the array can be stacked against the panels adjacent to the root spar, which has a substantial plate area. The root spar is mounted to gimbal 17, which in turn is mounted to base 11. The panel adjacent to the root spar has a substantial plate area against which the other gores rest. The various spars can be shaped to allow for flat stowage as shown.

Spacers 51 support the stowed assembly relative to base 11 during stowage. Sheets 53,54 of polyimide foam resiliently protects the stack against vibration force. These are disposed between the gore panels as appropriate.

If desired, a pyrotechnic pin 52 can be provided to release the assembly from the base. Root spar 12 is hingedly mounted to the gimbal for this purpose. Thus, the stowed assembly can be boosted by any means to tilt up from the base, after which its function is as previously described.

Any desired drive means can be used, including an electrical motor. Other types of drive means could also be used, for example, hot wax linear actuators with means to convert their linear motion to rotation of the rotor. The selection of suitable drive means is well within the skills of a good designer. The drive means will preferably be self-contained, and will utilize electrical energy for its operation. Then there is no need for mechanical transmissions or cables which must be pulled. Only leads to the drive means would be required.

The gores themselves form substrates for mounting solar cells 32 of which only a few are illustrated. The material selected should be able to tolerate a reasonable number of folding and unfolding cycles, and also should be resistant to the environment in which it will function. Lightness of weight is often a major criterion. Also, the substrate should be self shape-retaining in the sense that it should not stretch or slump.

The presently preferred substrate is a composite cloth of glass or quartz fiber. It is preferably open-scrim and Leno-weaved. A Leno-weave involves a tie between fibers at each of their crossings. A low-outgassing atomic oxygen-insensitive silicone adhesive coats the fibers to complete the composite. Care should be taken that only the fibers and ties are covered, so that the open characteristic of the scrim remains. This can significantly reduce the weight of the substrate, and further assures its foldability along the flexure. The solar cells are bonded to this substrate by any suitable bonding agent.

A suitable adhesive for application to the fiber is McGhanNuSil CV-1144 obtainable from Inamed Corporation, 1035 Cindy Lane, Carpinteria, Calif. 93013.

It will be observed that in the deployed condition, the gores become tensioned membranes between the spars. The gores may be made separately and may be individually attached to adjacent spars, or the substrate may instead be formed as a single piece, and the spars attached to it as preferred.

This invention is not to be limited by the embodiments shown in the drawings and described in the description which are given by way of example and not of limitation, but only in accordance with the scope of the appended claims.

We claim:

1. A solar cell array comprising a root spar having an axis, a lead spar, and a plurality of intermediate spars, a hub comprising an axle and a rotor mounted on and rotatable around said axle, said hub having an axis of rotation which is normal to the axis of the root spar;

drive means for rotating said rotor around said axle;

said root spar being fixed to said axle, said lead spar being fixed to said rotor, and said intermediate spars being mounted to said hub for free rotation around the axis of rotation of said hub, said spars extending radially from said hub;

a gore between and interconnecting each adjacent pair of spars, except between said root spar and said lead spar, each said gore being foldable along a mid-gore flexure which extends radially midway between its respective spars; and solar cells mounted to said gores on each side of the flexures;

whereby deployment is accomplished by rotating the hub and the lead spar to open the gores, and stowage is accomplished by reverse rotation of the hub and the lead spar.

2. A solar cell array according to claim 1 in which said spars depart from a plane which is normal to the axis of rotation of the hub whereby to form a cupped array structure when deployed.

3. A solar cell array according to claim 1 in which said gores are made of an open-scrim cloth.

4. A solar cell array according to claim 1 in which said gores comprise an open-scrim, Leno-woven cloth of glass or quartz fibers, the fibers being coated with a low-outgassing atomic oxygen-insensitive silicon adhesive, said adhesive covering the woven structure, but not occluding the openings in the scrim.

5. A solar cell array according to claim 4 in which said spars depart from a plane which is normal to the axis of rotation of the hub whereby to form a cupped array structure when deployed.

6. A solar cell array according to claim 1 in which a plate is hingedly connected to said root spar and to said lead spar, having an area so disposed and arranged that the stowed array bears against it.

7. A solar cell array according to claim 6 in which the gores when stowed are compressed between the plates by sheets of compressive foam to distribute compressive forces caused by the folding of the gores.

* * * * *